US012761130B2

(12) United States Patent
Riley et al.

(10) Patent No.: US 12,761,130 B2
(45) Date of Patent: Oct. 13, 2026

(54) VISCOSITY MEASUREMENT SYSTEM AND METHOD

(71) Applicant: BMIC LLC, Dallas, TX (US)

(72) Inventors: Xavier Riley, San Jose, CA (US); Igor Alovert, Morristown, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/390,740

(22) Filed: Dec. 20, 2023

(65) Prior Publication Data

US 2024/0201060 A1 Jun. 20, 2024

Related U.S. Application Data

(60) Provisional application No. 63/476,254, filed on Dec. 20, 2022.

(51) Int. Cl.
*G01N 11/00* (2006.01)
*B29C 37/00* (2006.01)
*B29K 95/00* (2006.01)
*B29K 309/08* (2006.01)
*B29L 31/10* (2006.01)

(52) U.S. Cl.
CPC .......... *G01N 11/00* (2013.01); *B29C 2037/90* (2013.01); *B29K 2095/00* (2013.01); *B29K 2309/08* (2013.01); *B29L 2031/108* (2013.01); *G01N 2011/0006* (2013.01); *G01N 2011/0073* (2013.01)

(58) Field of Classification Search
CPC ........... G01N 11/00; G01N 2011/0006; G01N 2011/0073; B29C 2037/90; B29K 2095/00; B29K 2309/08; B29L 2031/108
USPC ........................................................ 73/54.01
See application file for complete search history.

(56) References Cited

U.S. PATENT DOCUMENTS

| | | | | |
|---|---|---|---|---|
| 5,005,401 A * | 4/1991 | Pierce | G01N 11/00 73/54.41 |
| 5,686,661 A | 11/1997 | Singh et al. | |
| 6,227,040 B1 | 5/2001 | Hastings et al. | |
| 6,563,588 B2 | 5/2003 | Behroozi | |
| 7,263,874 B2 * | 9/2007 | Fitch | G01N 11/16 73/54.25 |

(Continued)

FOREIGN PATENT DOCUMENTS

| | | | | |
|---|---|---|---|---|
| CN | 208407523 U * | 1/2019 | |
| CN | 108645751 B * | 5/2020 | G01N 11/00 |

(Continued)

*Primary Examiner* — Marrit Eyassu
(74) *Attorney, Agent, or Firm* — GREENBERG TRAURIG, LLP

(57) ABSTRACT

A system may include an energy source configured to be directed at a first location in a fluid and configured to generate a wave in the fluid. A system may include a laser system configured to generate a laser pulse directed at a second location in the fluid and configured to illuminate at least a portion of the wave in the fluid. A system may include a sensor configured to detect the illuminated wave and generate an electric signal based at least in part on the illuminated wave. A system may include a processing system configured to: receive the electric signal from the sensor; and calculate a relative viscosity of the fluid based at least in part on the electric signal received from the sensor.

10 Claims, 6 Drawing Sheets

(56) References Cited

U.S. PATENT DOCUMENTS

| | | | | |
|---|---|---|---|---|
| 7,385,694 | B2 * | 6/2008 | Kolp | G01N 15/147 356/335 |
| 9,448,150 | B2 | 9/2016 | Estrada et al. | |
| 9,618,446 | B2 | 4/2017 | Speck et al. | |
| 10,184,872 | B2 | 1/2019 | Sakai | |
| 2002/0080362 | A1 | 6/2002 | Behroozi | |
| 2002/0116987 | A1 * | 8/2002 | Braithwaite | G01N 3/08 73/54.01 |
| 2007/0209938 | A1 * | 9/2007 | Zhang | G01N 27/44726 204/451 |
| 2013/0032736 | A1 * | 2/2013 | Tunheim | G01N 21/85 250/564 |
| 2015/0114627 | A1 * | 4/2015 | Tjhang | E21B 49/10 166/250.01 |
| 2017/0003209 | A1 * | 1/2017 | Estrada | G01N 29/02 |
| 2018/0195949 | A1 * | 7/2018 | Mabe Alvarez | G02B 21/06 |
| 2019/0203595 | A1 * | 7/2019 | Jamison | E21B 47/00 |
| 2019/0255534 | A1 * | 8/2019 | Shelton, Jr. | B02C 17/185 |
| 2022/0091072 | A1 * | 3/2022 | Berberig | G01F 1/86 |

FOREIGN PATENT DOCUMENTS

| | | | | | |
|---|---|---|---|---|---|
| CN | 112098272 | A | * | 12/2020 | G01N 11/00 |
| EP | 0933632 | A2 | | 8/1999 | |
| GB | 2192987 | A | * | 1/1988 | G01N 11/00 |
| KR | 20190107909 | A | * | 9/2019 | |
| WO | WO-2009070667 | A1 | * | 6/2009 | E21B 47/113 |

* cited by examiner

VISCOSITY MEASUREMENT SYSTEM AND METHOD

CROSS-REFERENCE TO RELATED APPLICATIONS

This application claims priority to U.S. Provisional Application No. 63/476,254, entitled "VISCOSITY MEASUREMENT SYSTEM AND METHOD," filed on Dec. 20, 2022, the entire contents of which are hereby incorporated by reference.

FIELD

This disclosure relates generally to a measurement apparatus. More particularly, this disclosure relates to a measurement apparatus for determining a viscosity of a fluid.

BACKGROUND

Measurement systems can be used to, for example, determine a viscosity of a fluid or a suspension. Viscosity of the fluid or suspension can vary depending on, for example, a temperature, pressure, or additives in the fluid or suspension.

SUMMARY

In some embodiments, a system includes an energy source configured to be directed at a first location in a fluid and configured to generate a wave in the fluid. In some embodiments, the system includes a laser system configured to generate a laser pulse directed at a second location in the fluid and configured to illuminate at least a portion of the wave in the fluid. In some embodiments, the system includes a sensor configured to detect the illuminated wave and generate an electric signal based at least in part on the illuminated wave. In some embodiments, the system includes a processing system configured to receive the electric signal from the sensor; and calculate a relative viscosity of the fluid based at least in part on the electric signal received from the sensor.

In some embodiments, the laser system is a laser imaging, detection, and ranging (LiDAR) system.

In some embodiments, the energy source is configured to excite the fluid.

In some embodiments, the first location is proximate the second location.

In some embodiments, the relative viscosity is determined relative to a baseline viscosity determined in a calibration mode.

In some embodiments, the relative viscosity is a change in the illuminated wave compared to a baseline viscosity determined in a calibration mode.

In some embodiments, the fluid is in a flowing state.

In some embodiments, the processing system is configured to determine an actual viscosity in centipoise based on the relative viscosity.

In some embodiments, the fluid is asphalt.

In some embodiments, a shingle manufacturing system includes an asphalt delivery system. In some embodiments, the asphalt delivery system is configured to deliver a fluid including asphalt to a glass mat. In some embodiments, the system includes a viscosity measurement system. In some embodiments, the viscosity measurement system includes an energy source configured to be directed at a first location in a fluid and configured to generate a wave in the fluid. In some embodiments, the viscosity measurement system includes a laser system configured to generate a laser pulse directed at a second location in the fluid and configured to illuminate at least a portion of the wave in the fluid. In some embodiments, the viscosity measurement system includes a sensor configured to detect the illuminated wave and generate an electric signal based at least in part on the illuminated wave. In some embodiments, the viscosity measurement system includes a processing system configured to receive the electric signal from the sensor; and calculate a relative viscosity of the fluid based at least in part on the electric signal received from the sensor.

In some embodiments, the laser system is a laser imaging, detection, and ranging (LiDAR) system.

In some embodiments, the energy source is configured to disturb the asphalt.

In some embodiments, the relative viscosity is determined relative to a baseline viscosity determined in a calibration mode.

In some embodiments, the processing system is configured to determine an actual viscosity in centipoise based on the relative viscosity.

In some embodiments, the energy source is a speaker configured to output a soundwave.

In some embodiments, the energy source is configured to output an airstream to generate a wave in the fluid.

In some embodiments, the fluid is in a flowing state.

In some embodiments, a method includes generating, by an energy source, a wave in a fluid. In some embodiments, the method includes generating, by a sensor, an electric signal based at least in part on the wave in the fluid. In some embodiments, the method includes calculating, by a processing system, a relative viscosity of the fluid based at least in part on the electric signal.

In some embodiments, the method includes directing a laser system at the fluid to illuminate at least a portion of the wave in the fluid.

In some embodiments, the fluid is asphalt.

In some embodiments, the method includes calculating an actual viscosity in centipoise of the fluid based on the relative viscosity.

In some embodiments, a system includes an energy source configured to be directed at a first location in a fluid and configured to generate a wave in the fluid. In some embodiments, the system includes a sensor configured to detect the wave and generate an electric signal based at least in part on the wave. In some embodiments, the system includes a processing system configured to: receive the electric signal from the sensor; and calculate a relative viscosity of the fluid based at least in part on the electric signal received from the sensor.

In some embodiments, the energy source is configured to excite the fluid.

In some embodiments, the relative viscosity is determined relative to a baseline viscosity determined in a calibration mode.

In some embodiments, the relative viscosity is a change in the wave compared to a baseline viscosity determined in a calibration mode.

In some embodiments, the fluid is in a flowing state.

In some embodiments, the processing system is configured to determine an actual viscosity in centipoise based on the relative viscosity.

In some embodiments, the fluid is asphalt.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Viscosity of fluids can change due to various factors such as, but not limited to, temperature changes, composition of the fluid, pressure changes, combinations thereof, or the like.

In manufacturing processes, viscosity of a fluid being used during the process can be important or even critical to obtaining acceptable production results. For example, in the shingle production process, asphalt may be used to coat a fiberglass mat. Changes in viscosity of the asphalt can cause issues with the production process. For example, if the asphalt is too viscous, then material may be wasted and the asphalt can cause jams in the manufacturing equipment and unwanted downtime associated with fixing such issues. Alternatively, if the asphalt is not viscous enough, the shingle produced may have poor physical properties, which can cause lost time and money while producing additional shingles that meet quality requirements, customer complaints, returns of the product, or the like.

Embodiments of this disclosure are directed to systems and methods for determining a viscosity of a fluid. In some embodiments, the systems and methods described can be used to determine the viscosity of a fluid in a harsh or a caustic environment. In some embodiments, the systems and methods described can be used to determine the viscosity of a fluid while the fluid is flowing. In some embodiments, the systems and methods described can be used to determine the viscosity of a fluid regardless of a color of the fluid. In some embodiments, the systems and methods described can be used to determine the viscosity of a fluid in a manufacturing system used, for example, to produce products in the roofing industry. For example, in some embodiments, the systems and methods described can be used to determine the viscosity of a fluid including asphalt to be used in, for example, producing roofing products such as, but not limited to, roofing shingles or the like.

Figure 1:
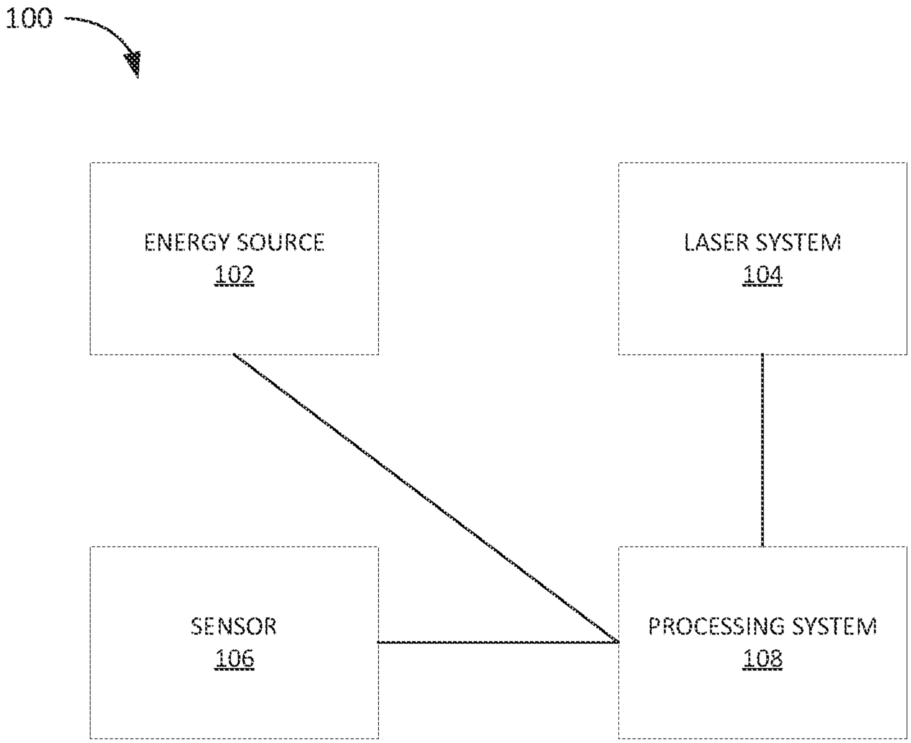
FIG. 1 illustrates a system, according to some embodiments.

FIG. 1 illustrates a system 100, according to some embodiments. In some embodiments, the system 100 is configured to be used to determine a viscosity of a fluid. In some embodiments, the system 100 can be configured to be used to determine a viscosity of a fluid used in manufacturing roofing components such as, but not limited to, roofing shingles. In some embodiments, the system 100 can be configured to be used to determine a viscosity of a fluid including asphalt used in manufacturing roofing components.

In some embodiments, the system 100 includes an energy source 102. In some embodiments, the energy source 102 can be configured to be directed at a first location in a fluid and configured to generate a wave in the fluid. As used herein, to generate a wave in the fluid means that the energy source 102 is used to disturb or excite the fluid, causing a physical wave in the fluid. In some embodiments, the energy source 102 can be a device configured to generate a sound-wave. In some embodiments, the energy source 102 can be a speaker or the like. In some embodiments, the energy source 102 can be an air nozzle or the like configured to output an airstream to generate a wave in the fluid. In some embodiments, the energy source 102 can include an air compressor, an air pump, or the like, with an airflow produced out through a conduit. In some embodiments, other energy sources may be usable and can be selected based on the fluid being tested.

In some embodiments, the energy source 102 is capable of creating a consistent wave in the fluid. in some embodiments, the wave can have a different profile depending upon the viscosity of the fluid. For example, in some embodiments, an amplitude or a frequency of the wave generated in the fluid can depend on the viscosity of the fluid.

In some embodiments, the fluid is in a flowing state (i.e., in motion). In some embodiments, the fluid can be in a static or non-flowing state (i.e., not in motion).

In some embodiments, the energy source 102 can be directed at a location of the fluid that is diverted from use in the manufacturing process. For example, the manufacturing equipment used in the manufacturing process may be such that the equipment is sensitive to changes in the fluid flow. Accordingly, it may be desirable to create the wave in the fluid with a portion of the fluid that is diverted from the manufacturing equipment. Moreover, in some embodiments, the fluid may generally be flowing within a closed body such as, but not limited to, a conduit or the like. In some embodiments, a portion of the fluid may be diverted, forming a fluid flow separate from the fluid delivered to the manufacturing equipment. In some embodiments, the fluid may be diverted into a "waterfall" configuration in which the fluid flows over a steep drop into a collection chamber and then returned to the manufacturing process so that no fluid is lost because of the system 100.

In some embodiments, the system 100 includes a laser system 104. In some embodiments, the laser system 104 is configured to illuminate at least a portion of the fluid. In some embodiments, the laser system 104 is configured to illuminate at least a portion of the fluid in which the wave has been generated by the energy source 102. In some embodiments, the laser system 104 is configured to generate a laser pulse directed at a second location in the fluid and configured to illuminate at least a portion of the wave in the fluid. In some embodiments, the laser system 104 may generate a constant laser beam instead of a laser pulse. In some embodiments, the laser system 104 can produce a mesh capable of being captured by a sensor 106. In some embodiments, the laser system 104 includes a laser imaging, detection, and ranging (LiDAR) system. In some embodiments, the energy source 102 and the laser system 104 can be directed at a location proximate each other in the fluid.

In some embodiments, the laser system 104 may be optional. An example of such embodiments is shown and described in additional detail in accordance with FIG. 2 below.

In some embodiments, the system 100 includes the sensor 106. In some embodiments, the sensor 106 is configured to detect the wave in the fluid. In some embodiments, the sensor 106 can be an optical sensor. In some embodiments, the sensor 106 can be a camera. In some embodiments, the sensor 106 is configured to detect the illuminated wave and generate an electric signal based at least in part on the illuminated wave. In some embodiments, the laser system 104 is sufficiently bright to illuminate the wave so that the sensor 106 can capture an image or a plurality of images of the fluid. In some embodiments, the sensor 106 can capture an image, a series of images, or a video stream of the fluid.

In some embodiments, the system 100 includes a processing system 108. In some embodiments, the processing system 108 is configured to receive the electric signal from the sensor 106 and calculate a relative viscosity of the fluid based at least in part on the electric signal received from the sensor. In some embodiments, the relative viscosity is based on a comparison to a baseline viscosity that can be determined during a calibration mode or process of the system 100. In some embodiments, the relative viscosity can be converted to an actual viscosity in centipoise.

In some embodiments, the energy source 102 and the sensor 106 can be combined. For example, in some embodiments, the sensor 106 can be a camera and the energy source 102 can be onboard the camera.

Figure 2:
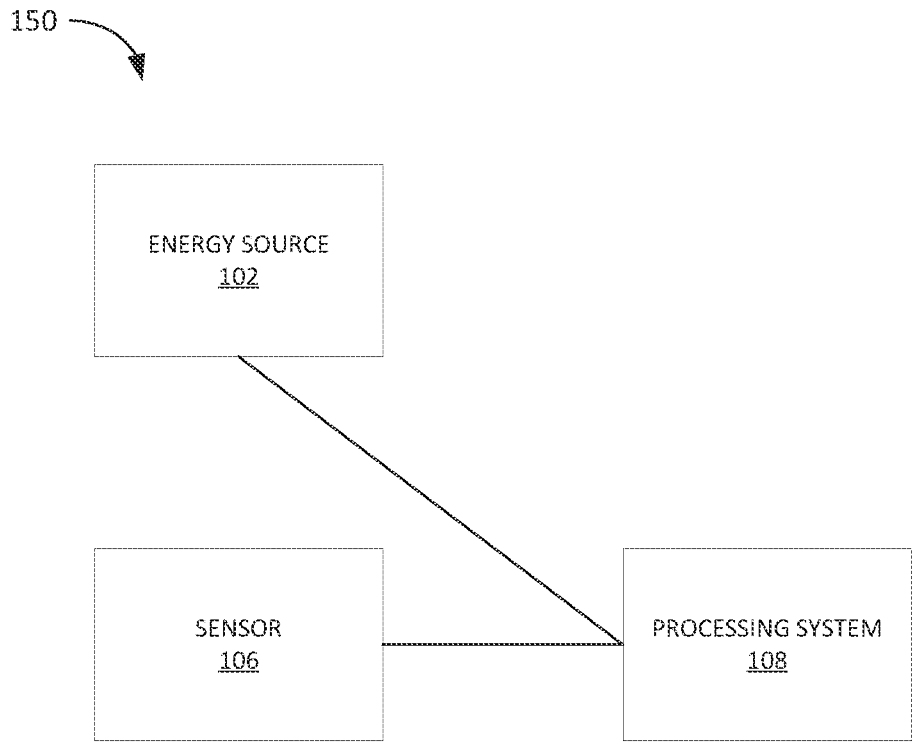
FIG. 2 illustrates a system, according to some embodiments.

FIG. 2 illustrates a system 150, according to some embodiments. In some embodiments, the system 150 is configured to be used to determine a viscosity of a fluid. In some embodiments, the system 150 is configured to be used to determine a viscosity of a fluid used in manufacturing roofing components such as, but not limited to, roofing shingles. In some embodiments, the system 150 is configured to be used to determine a viscosity of an asphalt used in manufacturing roofing components.

Aspects of FIG. 2 may be the same as or similar to aspects of FIG. 1. For simplicity of this Specification, aspects previously described will not be described again in additional detail unless specifically noted otherwise.

The system 150 includes the energy source 102, the sensor 106, and the processing system 108. The system 150 does not include the laser system 104. Instead, the sensor 106 can include a motion amplification camera. In such embodiments, the sensor 106 can be capable of capturing the wave in the fluid without additional illumination by a separate system. In some embodiments, the motion amplification camera can be included in the system 100 of FIG. 1, which may reduce a reliance on the laser system 104 or may enable selection of a less powerful laser system 104. In some embodiments, the sensor 106 can include a camera without motion amplification. In some embodiments, the sensor 106 can use a camera to detect wave amplitude changes by positioning the camera to detect wave height (amplitude changes) based upon a set reference. In some embodiments, the sensor 106 can use a plurality of cameras. In some embodiments, when using a plurality of cameras, images from the individual cameras can be combined to create a stereoscopic view of the wave. In some embodiments, the stereoscopic view of the wave can be used to determine distance or height of the wave.

Figure 3:
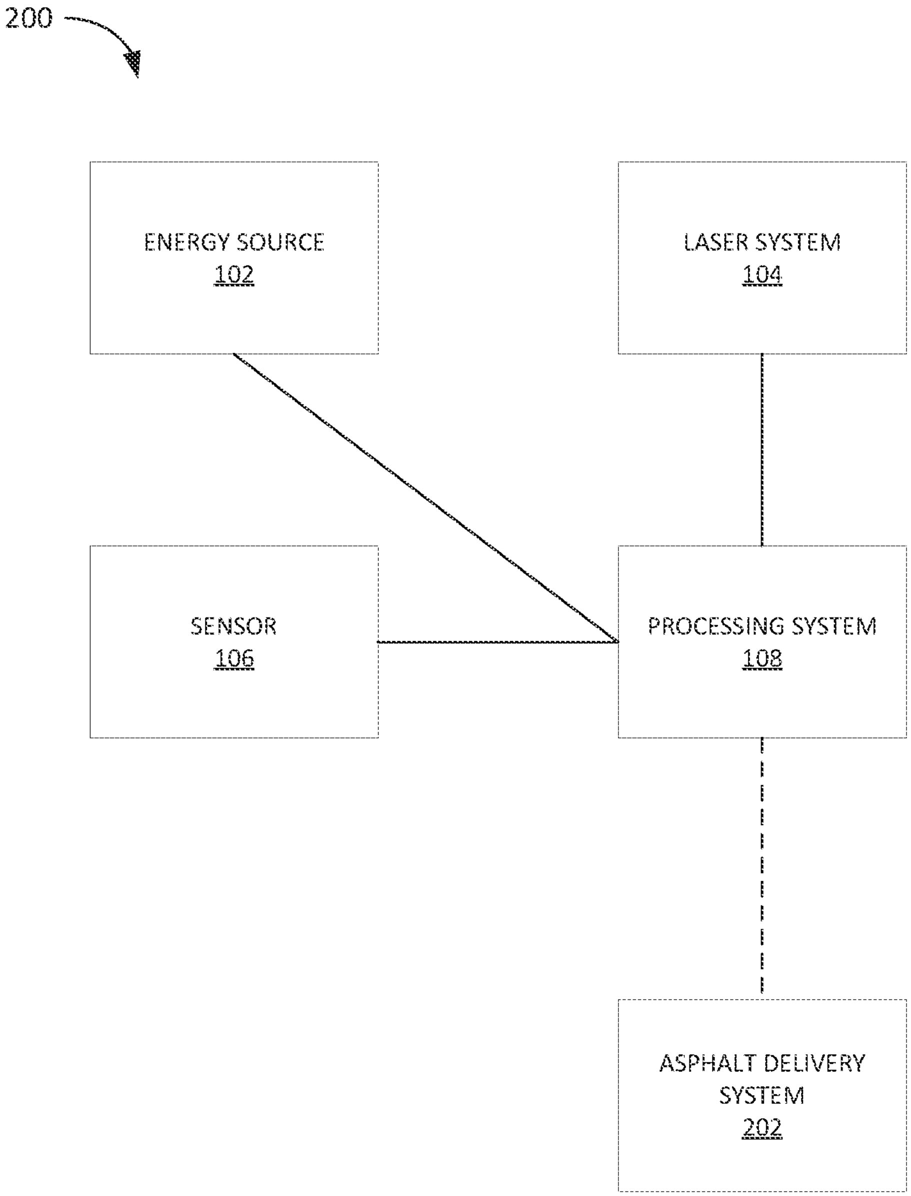
FIG. 3 illustrates a system, according to some embodiments.

FIG. 3 illustrates a system 200, according to some embodiments. In some embodiments, the system 200 is configured for use in a shingle manufacturing process. As such, in some embodiments, the system 200 can be referred to as a shingle manufacturing system or the like. In some embodiments, the system 200 is configured to be used to determine a viscosity of a fluid during manufacturing of a shingle. In some embodiments, the system 200 is configured to be used to determine a viscosity of an asphalt used in manufacturing shingles.

Aspects of FIG. 3 may be the same as or similar to aspects of FIG. 1. For simplicity of this Specification, aspects previously described will not be described again in additional detail unless specifically noted otherwise.

The system 200 includes the system 100 and additionally includes an asphalt delivery system 202. The asphalt delivery system 202 is configured to deliver a fluid including asphalt to a glass mat in the shingle manufacturing process. In some embodiments, a portion of the fluid from the asphalt delivery system 202 can be diverted as discussed above regarding FIG. 1 to determine a relative viscosity of the fluid.

Figure 4:
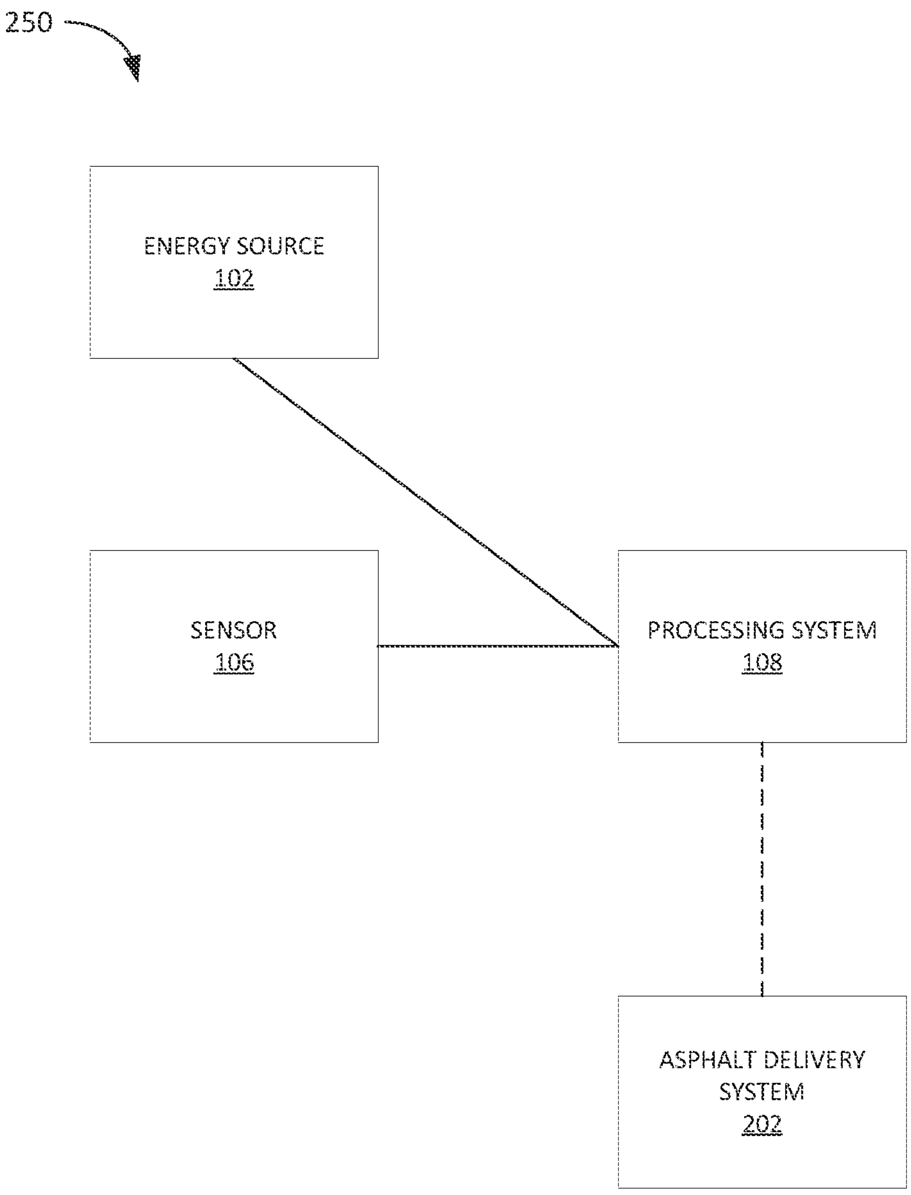
FIG. 4 illustrates a system, according to some embodiments.

FIG. 4 illustrates a system 250, according to some embodiments. In some embodiments, the system 250 is configured for use in a shingle manufacturing process. As such, in some embodiments, the system 250 can be referred to as a shingle manufacturing system or the like. In some embodiments, the system 250 is configured to be used to determine a viscosity of a fluid during manufacturing of a shingle. In some embodiments, the system 250 is configured to be used to determine a viscosity of an asphalt used in manufacturing shingles.

Aspects of FIG. 4 may be the same as or similar to aspects of FIG. 2. For simplicity of this Specification, aspects previously described will not be described again in additional detail unless specifically noted otherwise.

The system 250 includes the system 150 and additionally includes the asphalt delivery system 202.

Figure 5:
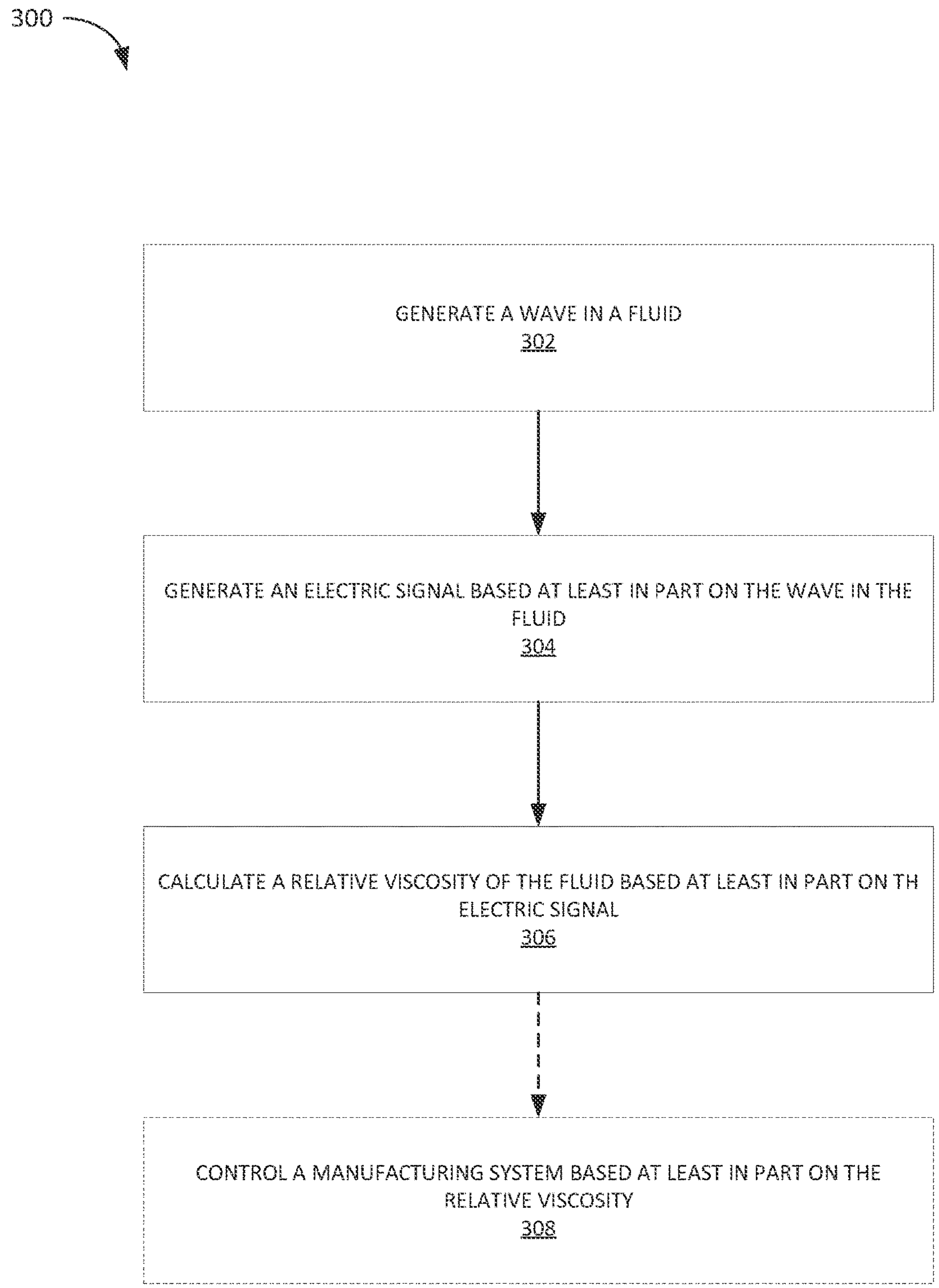
FIG. 5 illustrates a flowchart of a method, according to some embodiments.

FIG. 5 illustrates a flowchart of a method 300, according to some embodiments. In some embodiments, the method 300 can be performed using the system 100 of FIG. 1 or the system 150 of FIG. 2.

At block 302, the method 300 includes generating, by an energy source (e.g., the energy source 102) a wave in a fluid.

At block 304, the method 300 includes generating, by a sensor (e.g., the sensor 106), an electric signal based at least in part on the wave in the fluid.

At block 306, the method 300 includes calculating, by a processing system (e.g., the processing system 108), a relative viscosity of the fluid based at least in part on the electric signal.

In some embodiments, the relative viscosity as determined can optionally be used to control equipment in a manufacturing system, such as the system 200 of FIG. 3 or the system 250 of FIG. 4 at block 308.

Figure 6:
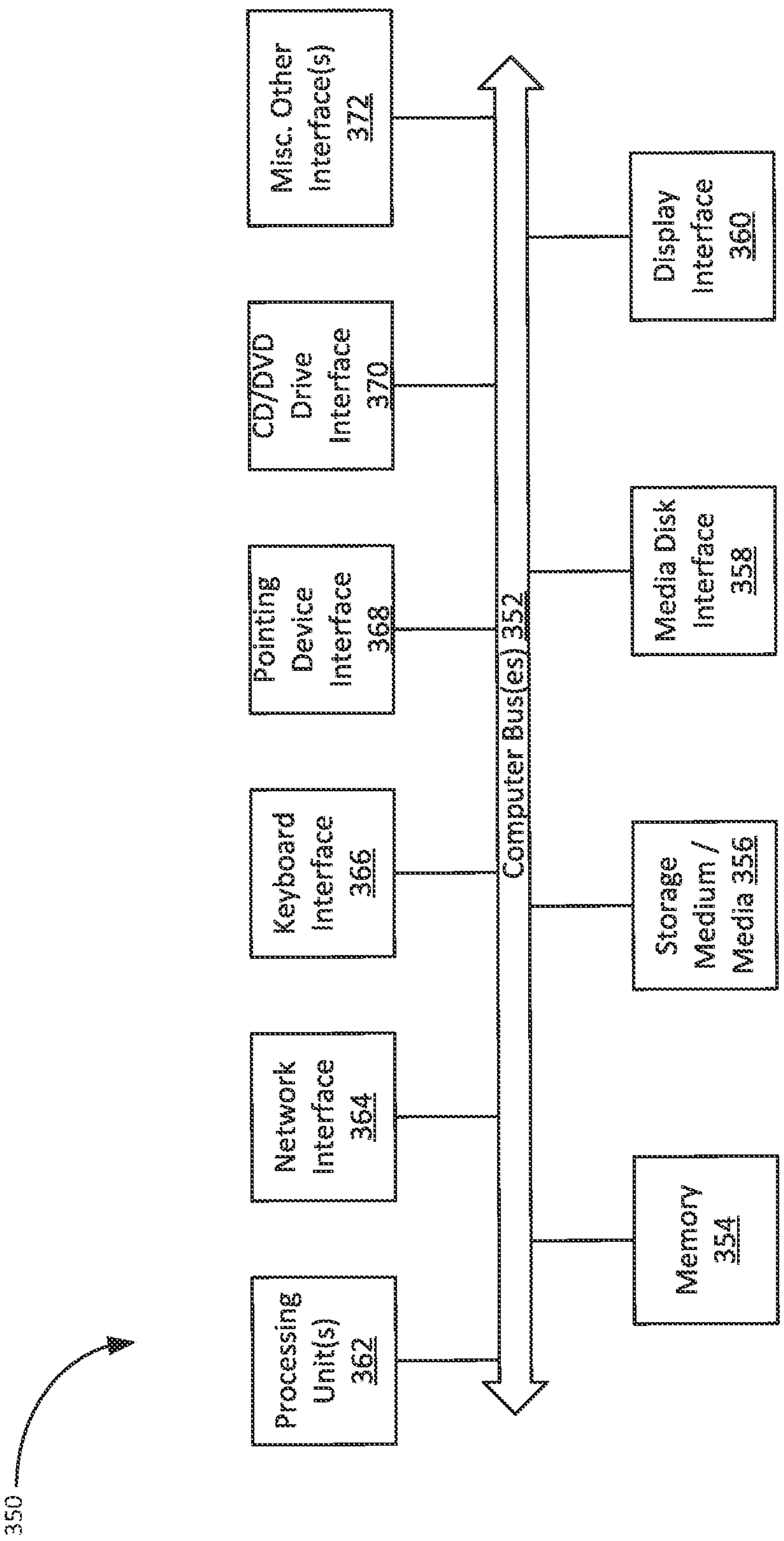
FIG. 6 is a block diagram illustrating an internal architecture of an example of a processing system, according to some embodiments.

FIG. 6 is a block diagram illustrating an internal architecture of an example of a processing system, such as the processing system 108 (FIG. 1), according to some embodiments. A computer as referred to herein refers to any device with a processor capable of executing logic or coded instructions, and could be a server, personal computer, set top box, smart phone, pad computer or media device, to name a few such devices. As shown in the example of FIG. 6, internal architecture 350 includes one or more processing units (also referred to herein as CPUs) 280, which interface with at least one computer bus 352. Also interfacing with computer bus 352 are persistent storage medium/media 356, network interface 364, memory 354, e.g., random access memory (RAM), run-time transient memory, read only memory (ROM), etc., media disk drive interface 358 as an interface for a drive that can read and/or write to media including removable media such as floppy, CD ROM, DVD, etc. media, display interface 360 as interface for a monitor or other display device, keyboard interface 366 as interface for a keyboard, pointing device interface 368 as an interface for a mouse or other pointing device, and miscellaneous other interfaces not shown individually, such as parallel and serial port interfaces, a universal serial bus (USB) interface, and the like.

Memory 354 interfaces with computer bus 352 so as to provide information stored in memory 354 to CPU 362 during execution of software programs such as an operating system, application programs, device drivers, and software modules that comprise program code, and/or computer executable process operations, incorporating functionality described herein, e.g., one or more of process flows described herein. CPU 362 first loads computer executable process operations from storage, e.g., memory 354, storage medium/media 356, removable media drive, and/or other storage device. CPU 362 can then execute the stored process operations in order to execute the loaded computer-executable process operations. Stored data, e.g., data stored by a storage device, can be accessed by CPU 362 during the execution of computer-executable process operations.

Persistent storage medium/media 356 is a computer readable storage medium(s) that can be used to store software and data, e.g., an operating system and one or more application programs. Persistent storage medium/media 356 can also be used to store device drivers, such as one or more of a digital camera driver, monitor driver, printer driver, scanner driver, or other device drivers, web pages, content files, playlists and other files. Persistent storage medium/media 356 can further include program modules and data files used to implement one or more embodiments of the present disclosure.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The internal architecture 350 can also include a drive interface 370 or other interfaces 372 for connecting to external devices or the like.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

The invention claimed is:

1. A system, comprising:
a device configured to form a fluid flowing in a closed body and in a steep drop;
wherein the fluid is an asphalt shingle coating;
a laser system,
wherein the laser system is configured to:
generate a laser pulse; and direct the laser pulse, at a location in which the fluid is flowing in the steep drop, to illuminate the fluid;
a sensor configured to detect the illuminated fluid and configured to generate an electric signal using the detected illuminated fluid; and
a processing system configured to:
receive the electric signal from the sensor; and
calculate a relative viscosity of the fluid based at least in part on the electric signal received from the sensor.

2. The system of claim 1, wherein the laser system is a laser imaging, detection, and ranging (LiDAR) system.

3. The system of claim 1, wherein the relative viscosity is determined relative to a baseline viscosity determined in a calibration mode.

4. The system of claim 1, wherein the relative viscosity is a change in the detected illuminated fluid compared to a baseline viscosity determined in a calibration mode.

5. The system of claim 1, wherein the processing system is configured to determine an actual viscosity in centipoise based on the relative viscosity.

6. A shingle manufacturing system, comprising:
an asphalt shingle coating delivery system, the asphalt shingle coating delivery system configured to deliver the asphalt shingle coating to a glass mat; and
a viscosity measurement system, comprising:
a device configured to form the asphalt shingle coating flowing in a closed body and in a steep drop;
a laser system,
wherein the laser system is configured to:
generate a laser pulse; and
direct the laser pulse, at a location in which the asphalt shingle coating is flowing in the steep drop, to illuminate the asphalt shingle coating:
a sensor configured to detect the illuminated asphalt shingle coating and configure to generate an electric signal using the detected illuminated asphalt shingle coating; and
a processing system configured to:
receive the electric signal from the sensor; and
calculate a relative viscosity of the asphalt shingle coating based at least in part on the electric signal received from the sensor.

7. The shingle manufacturing system of claim 6, wherein the laser system is a laser imaging, detection, and ranging (LiDAR) system.

8. The shingle manufacturing system of claim 6, wherein the relative viscosity is determined relative to a baseline viscosity determined in a calibration mode.

9. The shingle manufacturing system of claim 6, wherein the processing system is configured to determine an actual viscosity in centipoise based on the relative viscosity.

10. A method, comprising:

forming, by a device, asphalt shingle coating flowing in a closed body and in a steep drop;

generating, by a laser system, a laser pulse;

directing the laser pulse, at a location in which the asphalt shingle coating is flowing in the steep drop, to illuminate the asphalt shingle coating;

detecting, by a sensor, the illuminated asphalt shingle coating;

generating, by the sensor, an electric signal based at least in part on the detected illuminated asphalt shingle coating; and calculating, by a processing system, a relative viscosity of the asphalt shingle coating based at least in part on the electric signal.

* * * * *